United States Patent [19]

Terui

[11] 3,818,351

[45] June 18, 1974

[54] CHANNEL NUMBER DISPLAY DEVICE

[75] Inventor: Yasuaki Terui, Hirakata, Japan

[73] Assignee: Matsushita Electric Industrial Co., Ltd., Osaka, Japan

[22] Filed: July 18, 1972

[21] Appl. No.: 272,950

[30] Foreign Application Priority Data

July 20, 1971 Japan ................................ 46-54491

[52] U.S. Cl. ................................ 325/455, 325/469

[51] Int. Cl. ................................ H04b 1/26

[58] Field of Search ........... 325/455, 464, 465, 468, 325/469, 470, 420, 421, 422; 334/15, 18, 30, 33; 331/64, 4, 10, 18, 19; 317/101 CC, 101 C; 178/DIG. 15, 7.3 R, 7.3 DC

[56] References Cited

UNITED STATES PATENTS

| | | | |
|---|---|---|---|
| 3,509,484 | 4/1970 | Basse | 325/455 |
| 3,602,822 | 8/1971 | Evans et al. | 325/470 |
| 3,671,870 | 6/1972 | Wellhausen | 334/29 |
| 3,701,838 | 10/1972 | Olney, Jr. | 317/101 CC |
| 3,701,949 | 10/1972 | Turkish | 325/470 |

*Primary Examiner*—Benedict V. Safourek
*Attorney, Agent, or Firm*—Stevens, Davis, Miller & Mosher

[57] ABSTRACT

In a channel number display device used with an automatic channel selecting system there is provided a means which generates signals representative of a plurality of predetermined channels each time a control signal is applied thereto, the control signal being generated by a means for automatically selecting channel from among the predetermined channels by sequentially scanning the channels in the order of the number of the channels.

3 Claims, 9 Drawing Figures

CHANNEL NUMBER DISPLAY DEVICE

The present invention relates to an automatic channel selecting system and more particularly a device used in a system for sequentially and cyclically selecting the predetermined channels which device stops its channel selecting operation when the preset channels are reached and displays the numbers of the preset channels.

In a receiver employing an automatic channel selecting system, there is need for a means to display the number of the channel under reception. Particularly, in a device in which the channel selection is performed by manually changing the circuit constant of the tuning circuit the selection of a particular channel and the display of the channel is performed at a time if the display mechanism is associated with the manual mechanism. The preset type receiver can be instantaneously tuned to desired channels by pushing the buttons corresponding to the channels since the receiver is previously tuned to some selected channels. If the number of the channels to be received by a receiver of preset type is small, no display device is needed since the channel numbers can be entirely committed to the memory of the manual operation. With increasing channel number, however, the channel selection by the push button method grows more and more difficult. The reason is that the push button mechanism usually becomes expensive as well as complicated with the increase in the number of the channels to be received.

There is now an increasing demand for a device capable of automatically selecting channels since there is an apparent tendency in, for example, TV broadcasting to the increase in the number of channels in UHF band. The automatic channel selecting apparatuses now in current use may be divided roughly into two groups: One which scans cyclically and sequentially the channels in the order of the magnitude of the numerals indicating the channels and the other which selects a particular channel by specifying it on a key board.

The former will need more time in channel selecting operation due to its cyclic mechanism and the latter will have a more complicated structure. However, the former has a merit that it enables one to select channels while one is watching the program so that one can select whatever channel one likes. Thus, the automatic channel selecting apparatuses in current use have found their sound application in the field of the art. Moreover, electronically speaking the time required in the former for channel selection is not so different from that of the latter.

The present invention is concerned with a channel number display device for use especially in an automatic channel selecting system of such a cyclic scanning type as described above. In Japan, for example, the TV broad casting is carried on through sixty three channels, i.e. 1st to 63th channels. These channels are appropriately distributed in UHF band.

The way of distribution is, however, different from one locality to another. Therefore, in order to fabricate a device which can display all the channel numbers, a complicated digital control circuit consisting of a shift register having 24 bits and 80 gates is needed.

According to the present invention, a display device can be realized which can easily display the numbers of channels by adopting a system to sequentially read out the numbers of the preset channels used in broadcasting.

Accordingly, it is one object of the present invention to obtain a display signal representing channel numbers with a simple constitution and to display the numbers on the basis of the signal.

Another object of the present invention is to facilitate the identification of the channel numbers.

Yet another object of the present invention is to facilitate the present operation of the channel number display device.

Now, the present invention will be described by way of embodiments through reference to the attached drawings; wherein FIGS. 1*a*, 1*b* and 1*c* are block diagrams of television receivers employing a device for displaying the numbers of reception channels according to the present invention;

Figures 1A, 1B, 1C:
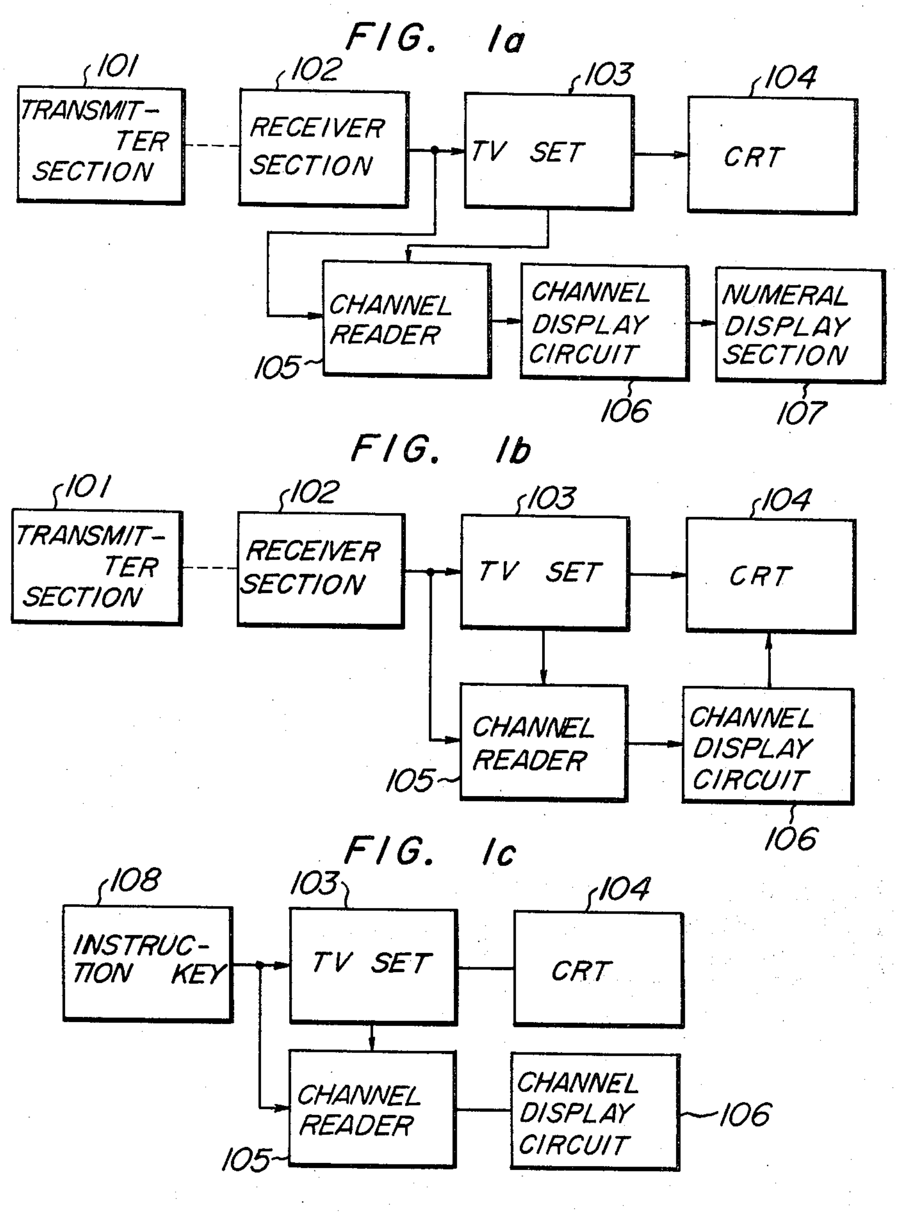

Description will be made of an embodiment wherein the device according to the present invention, i.e. channel number indicator, is applied to a television receiver capable of receiving channels 0 to 69. In FIG. 1, a transmitter section 101 constituting a remote control device can produce an instruction signal when it is desired to change over channels. A receiver section 102 will receive the instruction signal. The instruction signal received by the receiver section 102, is fed to a TV receiver 103 employing an automatic channel selecting system and display on its picture tube. The TV receiver 103 cyclically performs the operation of channel selection according to the output of the receiver section 102. A channel reader 105, which is connected with the output of the receiver section 102, reads the numbers of channels corresponding to the reception channels of the TV receiver 103. A channel indicator circuit 106 is connected with the channel reader 105 and a numeral display section 107 is connected with the channel display circuit 106.

In FIG. 1*b*, a system is shown which is different from that shown in FIG. 1*a* in that the numeral display section 107 is substituted by a picture tube that can display the channel numbers in superposition.

FIG. 1*c* shows another system which is different from the system shown in FIG. 1*b* in that the transmitter section 101 and the receiver section 102 are substituted by an instructing key 108.

In FIGS. 1*a* to 1*c*, the characteristic constituents are the automatic tuned TV receiver 103, the channel reader 105 for reading channel numbers and the channel indicator circuit 106.

Figure 2:
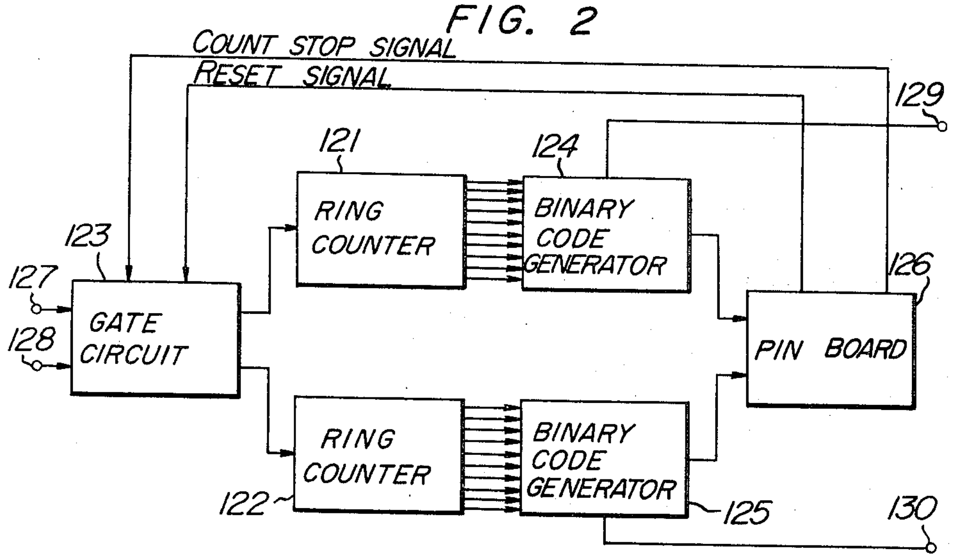
FIG. 2 is a block diagram of a device for displaying the numbers of reception channels which device embodies the present invention.

The channel reader 102, as shown in FIG. 2, comprises a first ring counter 121 corresponding to the first digit of the channel number, a second ring counter 122 corresponding to the second digit of the channel number, a gate circuit 123 to control these counters 121 and 122, binary code generator 124 and 125 which not only invert the outputs of the counters 121 and 122, respectively, but also convert them into the corresponding binary-coded decimal signals, and a pin board 126 to preset the channel numbers. A constant pulse train and a count starting pulse are applied respectively to the terminals 127 and 128 of the gate circuit 123.

The pulse to start counting is first applied through the terminal 128 to the gate circuit 123 and accordingly the pulse train reaching the terminal 127 is passed through the gate 123 and fed to the ring counters 121 and 122.

The ring counters 121 and 122 may count the numbers 0 to 69 and the outputs of the counters 121 and 122 are fed respectively to the binary code generators 124 and 125. When the outputs of the binary code generators 124 and 125 which are the inversions of the outputs of the ring counters 121 and 122, coincides with the channel number set in the presetting pin board 126, the pin board 126 delivers a signal to stop counting to the gate circuit 123, which blocks the pulse train in response to the signal. If the next count starting pulse arrives at the terminal 128 of the gate 123, the pulse train passes through the gate 123 and resumes the counting operation of the counters 124 and 125. And when the next channel number is reached by the outputs of the binary code generators 124 and 125, the counting operation is ceased again.

The sixty nine channels are covered in this manner, and after the 69th channel has been selected, the presetting pin board 126 delivers a reset pulse which resets the counters 121 and 122 so that the first channel is again selected.

When a particular channel is selected, the binary code corresponding to the number of the selected channel is obtained from the circuits 124 and 125. Thus, the selected channel can be displayed on, for example, a numeral display tube by reading out the binary code from the respective terminals 129 and 130.

Figure 3:
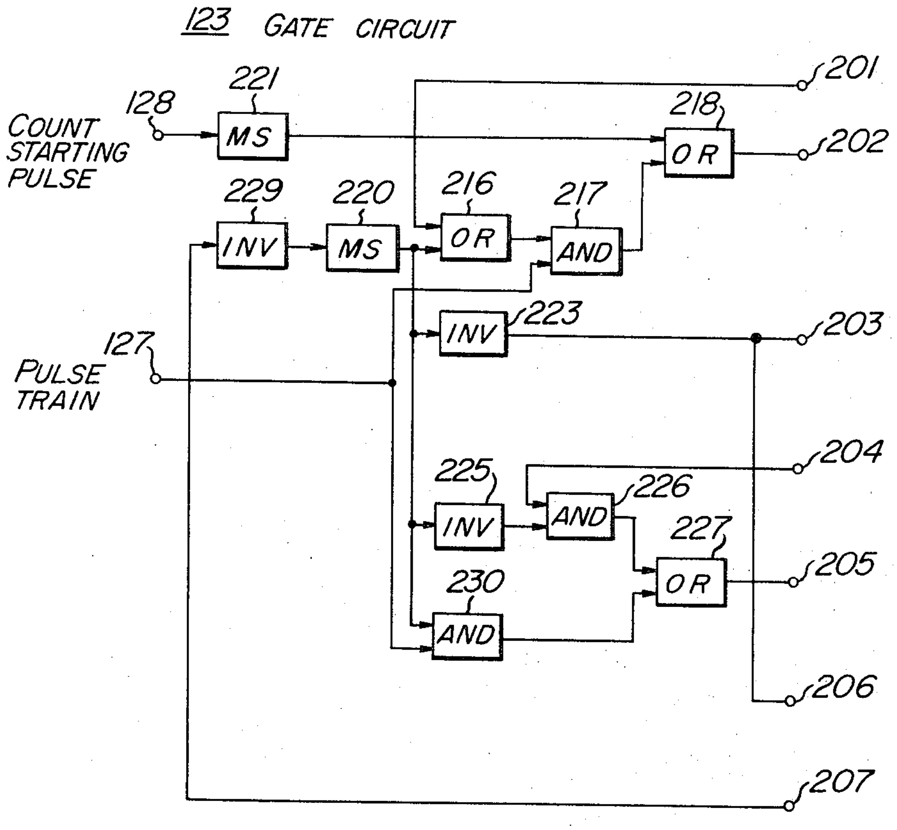
FIG. 3 is a detailed diagram of a gate circuit constituting the main part of the device shown in FIG. 2.
Figure 4:
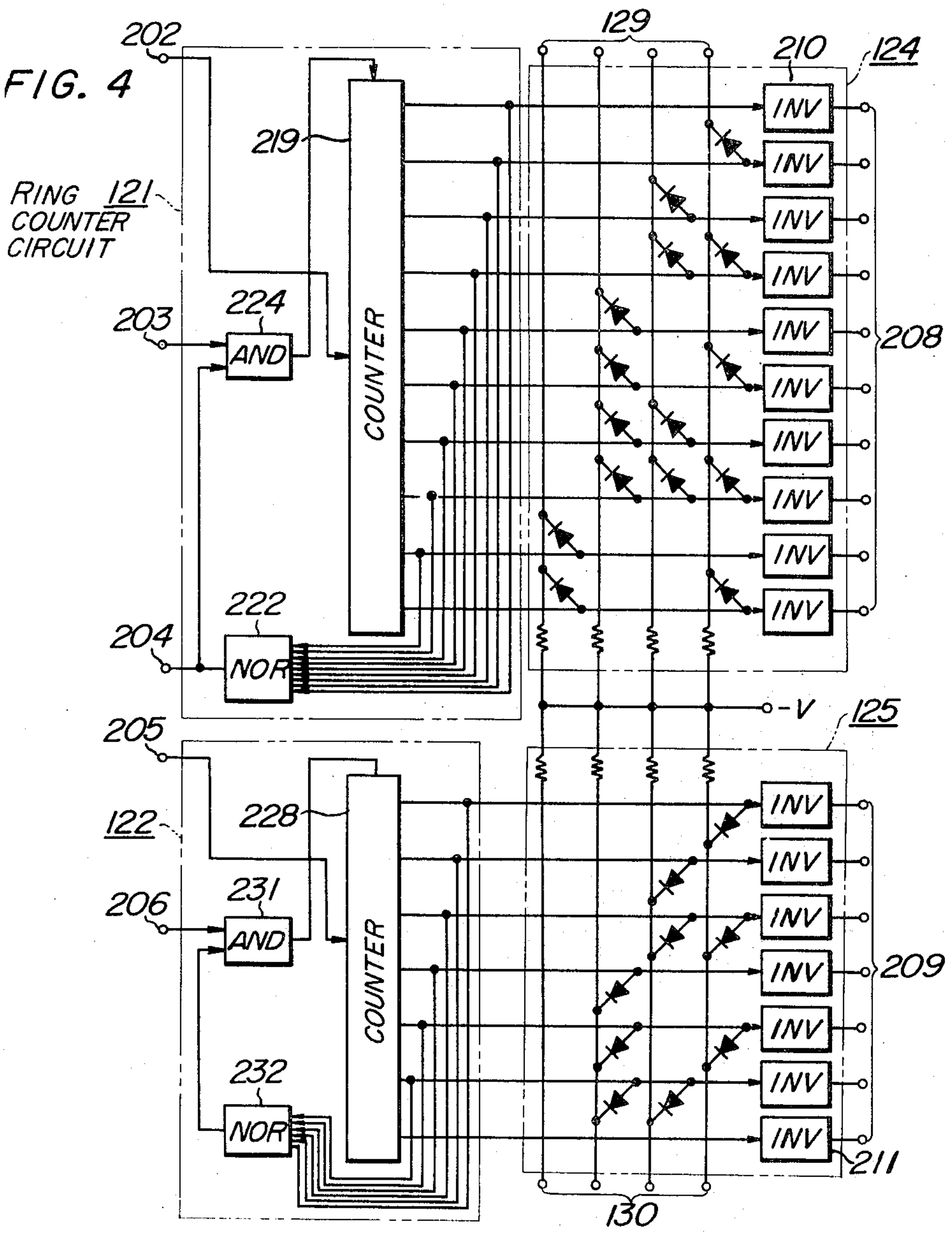
FIG. 4 is a detailed diagram of both a ring counter and a binary code generator.
Figure 5:
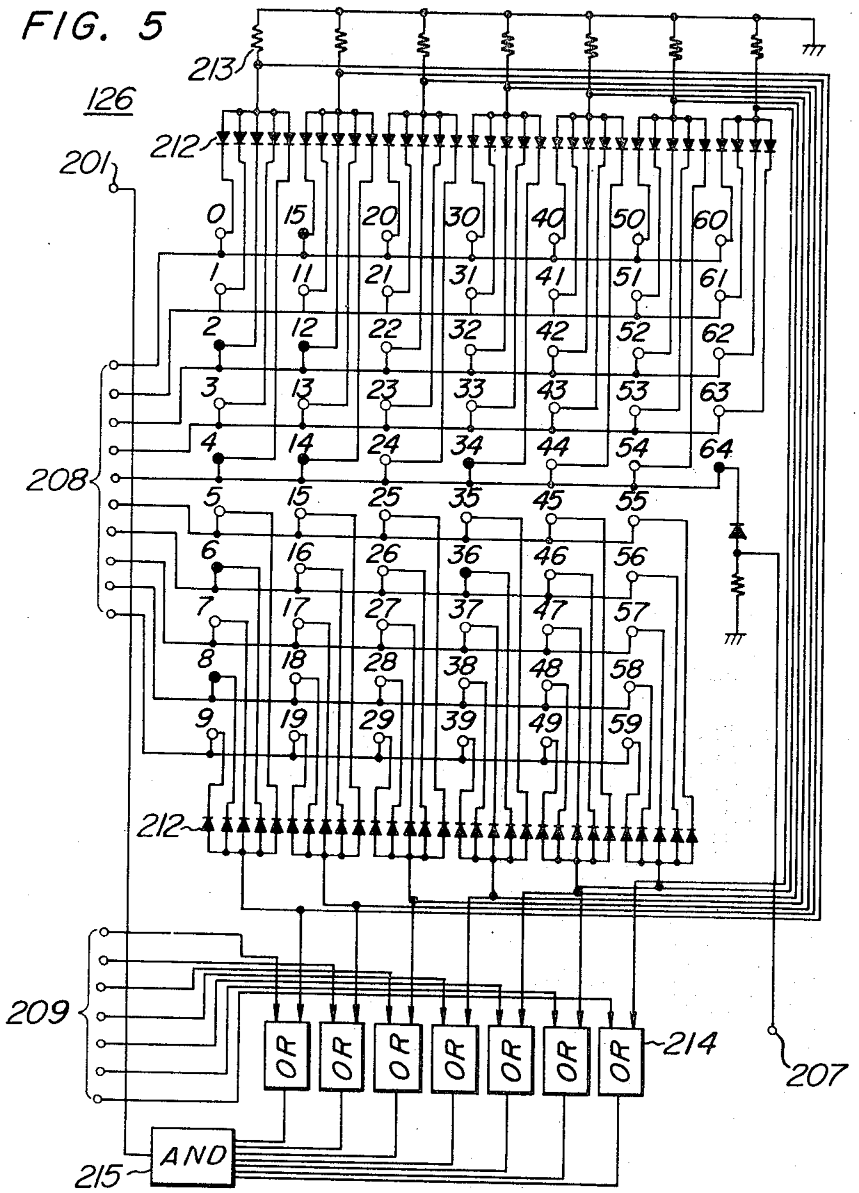
FIG. 5 shows in detail the construction of a pin board used in the device according to the present invention.

FIGS. 3 to 5 show in detail the constituent circuit configurations of the embodiment described above; FIG. 3 showing a gate circuit 123, FIG. 4 ring counters 121 and 122 and binary code generator 124 and 125, and FIG. 5 a pin board 126 and its periphery circuits. In the pin board 126, blackened small circles such as labeled 2, 4, 6, 8, etc. indicate sockets in which pins are inserted to set the corresponding channel numbers. In FIGS. 3 to 5 throughout, the same numeral has been applied to like terminals. If the first terminal of the ring counter 121 and the first terminal of the ring counter 122 are both kept at a high potential level while all the other terminals of both the ring counters 121 and 122 are maintained at a low level, then the binary code generators 124 and 125 deliver at the first one of the output terminals 208 of a group 210 of inverters and the first one of the output terminals 209 of a group 211 of inverters a low level but at all the other output terminals of the inverters of both the groups 210 and 211 a high level.

In the circuit of the pin board 126, the channels 0 to 9, 10 to 19, 20 and 29, . . . , 50 to 59, etc. are connected respectively with OR gate circuits consisting of seven groups of diodes 212 and seven resistors 213, outputs of which are connected with the corresponding OR gates of a group 214. Namely, the first OR gate of the group 214 receives the outputs from the channels 0 to 9 as well as the output at the first terminal of a group 209 of terminals, the second OR gate of the group 214 receives the outputs from the channels 10 to 19 as well as the output at the second terminal of the terminal group 209, and so on. With the pin board as shown in FIG. 5 wherein the preset channels are indicated by darkening small circles representing sockets for receiving pins therein, all the outputs of the OR gates of the group 214 are at a high level if the first terminal of the group 208 and the first terminal of the group 209 are kept at a low level while all the other terminals are maintained at a high level. Accordingly, an AND gate 215 delivers a high level output at its terminal 201. Namely, a high level output of the binary code generator 125 is applied to the 2nd to 4th OR gates of the group 214 and therefore the corresponding inputs of the AND gate 215 are kept at a ligh level. As for the first OR gate of the group 214, the corresponding output applied from the binary code generator 125 to the first OR gate is at a low level. However, the channel 0 is not set and one of the inputs of the first OR gate of the group 214 is kept at a high level so that the first input of the AND gate 215 is also maintained at a high level.

If a high level output is delivered at the terminal 201, the OR gate 216 in the gate circuit 123 accordingly delivers a high level output, as seen from FIG. 3. Consequently, the AND gate 217 lets the pulse train from the terminal 127 pass therethrough and the pulse train is further transmitted through the OR gate 218 to the terminal 202. Then, as will be described below, the input to the ring counter circuit 121 is at a high level and the counter section 219 of the circuit 121 shifts in response to the pulse train. Once the counter 219 begins to shift the above said input falls to a low level and is kept at the low level until all the ten terminals 208 are covered by the shifting.

The channel 2 is preset by means of a pin inserted in the socket, as seen in FIG. 5. Therefore, if the third terminal of the group 208 is driven to a low level by the counter 219, the two inputs of the first OR gate of the group 214 become a low level. Consequently, the output of the AND gate 215 becomes a low level so that the AND gate 217 is closed by means of the OR gate 216. Namely, under a normal condition, one of the outputs of the OR gate 216 is kept at a low level by means of the monostable circuit 220 and the output level of the OR gate 216 becomes low when the output of the AND gate 215 is rendered to a low level. Accordingly, the AND gate 217 blocks the pulse train from the terminal 127 so that the shifting operation of the ring counter circuit 121 stops to select the channel 2 and the binary code corresponding to the channel 2 appears at the output terminals 129 and 130 of the binary code generators 124 and 125.

If, in this state, a count starting signal is applied to the terminal 128, the monostable circuit 221 is actuated by the signal and an output pulse appears through the OR gate 218 at the terminal 202. The ring counter circuit 121 shifts in response to the pulse to select the channel 3. However, the channel 3 is not preset, as seen in FIG. 5, and it is, therefore, clear that the output of the AND gate 215 becomes a high level. Then, the AND gate 217 is opened by means of the OR gate 216 so that the pulse train from the terminal 127 is applied to the ring counter circuit 121. If the ring counter 121 shifts to the channel 4, which is preset in the pin board 126, the output level of the first OR gate of the OR gate group 214 becomes low again and consequently the output level of the AND gate 215 becomes low. Accordingly, the counter 219 stops shifting at a location corresponding to the channel 4.

In this way, the preset channels can be sequentially selected by applying to the terminal 128 a pulse for changing over channels. When the ring counter circuit 121 shifts to the channel 9, the NOR gate delivers a high level output. In this case, the first to ninth terminals of the counter 219 deliver a low level output and only the tenth terminal corresponding to the channel 9 delivers a high level output, thus the level at the terminal 204 turning from low to high. Since, at this time, the output of the inverter 223 is a high level and the input terminal 203 of the AND gate 224 is kept at a high level, the output level of the AND gate 224 is high. The output of the AND gate 224 is then applied to the counter 219, which again shifts its output to the first terminal thereof in response to the next pulse applied to the terminal 127.

Accordingly, the ring counter circuit 122 shifts its output from the first terminal to the second one. Namely, since the output of the monostable circuit 220 is a low level, the output of the inverter 225 is a high level. Therefore, the AND gate 226 is opened to the input from the terminal 204, i.e., the output of the NOR gate 222. The output of the AND gate 226 is applied through the OR gate 227 to the terminal 205 to shift the counter 228 of the ring counter circuit 122. In this manner, the channel 10 has been selected. In a similar manner, the channels 12, 14, 34, and 36 can be selected.

The ring counters 121 and 122 shift sequentially from the channel 37 to the channel 63 since there is no preset channel among the twenty seven channels. When the channel 64 is reached and therefore a low level output appears at the terminal 207, the inverter 229 of the gate circuit 123 delivers a high level output. This high level output triggers the monostable circuit 220, the output of which is fed through the OR gate 216 to the AND gate 217 so that the AND gate 217 is opened to pass the pulse train from the terminal 127 to the clock terminal 202 of the ring counter 121. At the same time, the AND gate 230 is also opened by the output of the monostable circuit 220 and the pulse train from the terminal 127 is passed through the AND gate 230 and the OR gate 227 to the clock terminal 205 of the ring counter 122. When the output of the monostable circuit 220 is at a high level, the inverter 223 delivers a low level output to keep the terminals 203 and 206 at the low level so that the AND gates 224 and 231 of the ring counters 121 and 122 are both closed. The output of the NOR gate 232 connected with the output of the counter 228 is blocked at the AND gate 231 so that the input of the counter 228 is at a low level, i.e. zero level. The NOR gate 222 to which the ten outputs of the counter 219 are applied, delivers a low level output while nine of the outputs of the counter 219, i.e. the first to ninth output terminal, deliver their outputs sequentially. When the tenth terminal of the counter 219 delivers an output, the NOR gate 222 deliver a high level output. If, in this case, the AND gate circuit 224 is closed, a low level, i.e. zero level is applied to the counter 219. When the monostable circuit 220 resumes its stable state after the counters 219 and 228 have been all cleared, the inverter begins to deliver a high level output. Accordingly, the AND gates 224 and 231 open in response to the high level signal at the terminals 203 and 206 so that the outputs of the NOR gates 222 and 232 are applied respectively to the input terminals of the counter 219 and 228. All the outputs of the counter 228 are of a low level and therefore all the outputs of the binary code generator 125 are turned into a high level by means of the group of inverters 211. The high level outputs of the inverters 211 are in turn applied through the group of OR gates 214 to the AND gate 215. Accordingly, the terminal 201 is kept at a high level, and the OR gate 216 and the AND gate 217 open so that the pulse train from the terminal 217 is applied through the AND gate 217 and the OR gate 218 to the counter 219 to cause a high level output to appear at the first terminal thereof.

On the other hand, when the monostable circuit 220 recovered its stable state as mentioned before, the AND gate 226 of the gate circuit 123 is opened by means of the inverter 225. Since a high level input is applied from the NOR gate 222 to the terminal 204 because the counter 219 was cleared, the high level signal is fed through the AND gate 226 and the OR gate 227 to the counter 228. Therefore, the first output terminal of the counter 228 is also kept at a high level.

When high level inputs are applied to the NOR gates 222 and 232, the AND gates 224 and 231 are closed. Accordingly, every time the terminals 202 and 205 receive outputs, the high level outputs of the counters 219 and 228 are shifted, and the counting operation stops when any preset channel is reached.

As has hitherto been described, with the device according to the present invention, the preset channel numbers can be sequentially selected from the channel 0 up to the channel 64 and the thus selected channel numbers can be read out in terms of codes. In a TV receiver employing an automatic channel selecting system, therefore, the selected channel numbers can be easily recognized. In addition, the channel selection and the identification of the desired channel number can be much facilitated only by presetting the device in accordance with the locality.

This kind of device, of course, can be used not only in a TV receiver but also in other receivers. The latter case can be realized, for example, by constructing in the same manner as described above the tuning circuits tuned to the corresponding channels to be received.

Figure 6A:
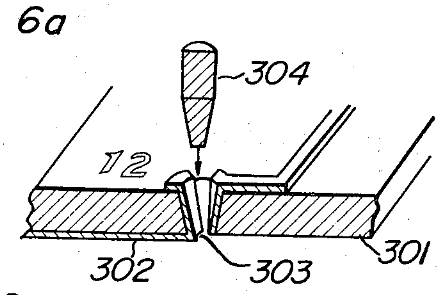
FIGS. 6*a* and 6*b* are a perspective view of the pin board, in which a part of its geometrical configuration is shown in detail.
Figure 6B:
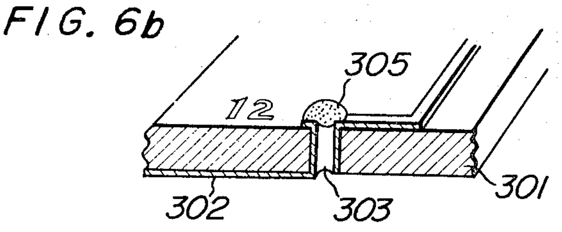

FIGS. 6*a* and 6*b* show the detailed construction of the pin board described above, in which a matrix of metal wiring 302 is disposed on a substrate 301 and perforations 303 cut in the substrate 301 have their walls and brims covered with conductive film connected with the metal wiring 302. The conductive film of each performation 303 is not continuous but breaks at a portion or two, as seen in FIG. 6*a*. And when the presetting is required, it is only necessary either to insert pins 304 of metal into the perforations 303, as seen in FIG. 6A, or to apply solder to the perforations, as seen in FIG. 6*b*, in order to connect electrically the breaks of the conductive film.

What is claimed is:

1. A television channel number display device comprising:

first means cyclically selecting channels in a predetermined order;

second means generating a start count signal every time one channel is changed over to another;

a ring counter circuit coupled to said second means for counting a specific continuous signal applied to the input of said counter circuit in response to said start count signal;

third means coupled to said counter circuit and displaying the output signals of said ring counter circuit as the numbers of selected channels;

television channel preselection means, including a pin board having pin holes whose number corresponds to that of the television channels to be received, said ring counter circuit being connected with said pin board in a predetermined manner, and wherein the output signals of said ring counter circuit, which are obtained by way of said pin board, corresponding to the information preselected in said pin board are used as a concidence signal to stop the counting operation of said ring counter circuit;

fourth means stopping the counting operation of said ring counter circuit when the output signals of said ring counter circuit concide with a television channel number preselected in said pin board; and a gate circuit coupled to said start count signal generating means, said television channel preselection means and said counter circuit, said gate circuit being opened by said start count signal and closed by a coincidence signal generated when the outputs of said ring counter circuit concide with the preselected television channel number, a clock signal being applied as an input to said gate circuit, and the output of said gate circuit causing said ring counter circuit to start counting.

2. A channel number display device according to claim 1, wherein said counter circuit comprises a first ring counter indicating the first digit and a second ring counter indicating the second digit, said preset means is a pin board having pin holes whose number corresponds to that of the channels to be received, and wherein a first group of terminals in said pin board are connected with the outputs of said first ring counter while a second group of terminals in said pin board are connected with the outputs of said second ring counter so that said outputs of said second ring counter are fed to an AND gate, the output of which is used as said coincidence circuit.

3. A channel number display device according to claim 1, wherein said preset means comprises a substrate and matrix wirings disposed on both the surfaces of said substrate.

* * * * *